Oct. 22, 1963  H. FORWALD  3,107,692
AIR BLAST VALVE PARTICULARLY FOR ELECTRIC CIRCUIT BREAKERS
Filed Sept. 28, 1961
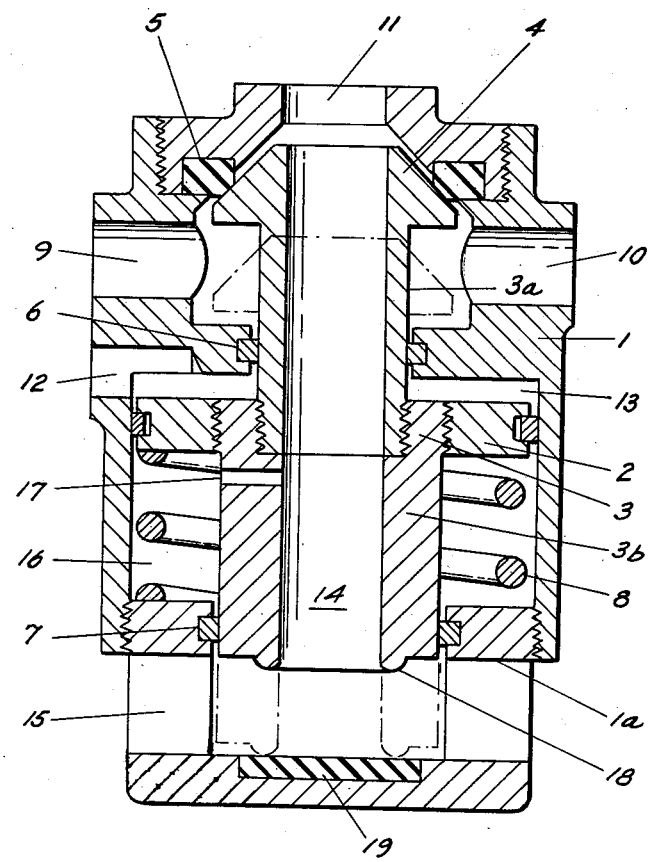
INVENTOR.
HAAKON FORWALD
BY
Bailey, Stephens & Huebig
ATTORNEYS 3,107,692
AIR BLAST VALVE PARTICULARLY FOR
ELECTRIC CIRCUIT BREAKERS
Haakon Forwald, Ludvika, Sweden, assignor to Allmanna Svenska Elektriska Aktiebolaget, Vasteras, Sweden, a Swedish corporation
Filed Sept. 28, 1961, Ser. No. 141,382
Claims priority, application Sweden Oct. 4, 1960
1 Claim. (Cl. 137—625.27)

My invention relates to a compressed air valve for use with air blast circuit breakers.

In accordance with the invention, a valve head is provided which is normally biased to a closed position by means of a biasing spring. A differential piston is connected to the valve head and has a first and relatively large area contained within a first space which, when the valve opens, is placed in communication with high pressure air, while the other side of the differential piston and the relatively small side defines a second space which, when the valve is open, is connected to a high pressure source of operating air through a pressure-equalizing channel through the valve.

The valve of the present invention will be seen to be exceedingly rapid in operation. That is, when the valve is closed, the second space limited by the smaller area of the differential piston is not connected to the high pressure source of operating air and consequently contains air at atmospheric pressure. Thus the air in this space provides no substantial counter pressure when the valve is opened, whereby the valve opening can take place extremely rapidly.

When the valve is opened, and the second space is placed in communication with the high pressure air through the equalizing channel, there is no substantial time for increase in pressure in the space before the valve is completely opened. After a predetermined time, however, the compressed air in the second space reaches the value of the high pressure supply conduit so that, when the valve is to be closed, the air pressure in the first space need not be decreased as much as would have been necessary had the air pressure in the second space been unchanged.

Therefore, when such a valve is used, the operating time from the reception of a closing impulse until the actual closing of the open valve is considerably reduced.

Accordingly, a primary object of this invention is to provide a novel compressed air valve for air blast circuit breakers.

Another object of this invention is to provide a novel compressed air valve for air blast circuit breakers in which the valve operating speed is increased.

A further object of this invention is to provide a rapidly operating compressed air valve for air blast circuit breakers which utilizes a differential piston.

These and other objects of my invention will become apparent from the following description of the drawing which shows a cross-sectional view of a compressed air valve constructed in accordance with the present invention.

Referring to the drawing, the valve housing 1 contains a piston 2 therein. The piston 2 is threadably connected to operating rod 3 which includes an upper hollow member 3a which is threadably connected to a lower and wider diameter body portion 3b. The upper portion 3a is fastened to a valve head 4 which moves into engagement with a valve seat 5 when the valve is closed.

Sealing rings 6 and 7, such as continuously sealing O-rings, are carried within the chamber 1 and the threadably received chamber bottom 1a respectively. A spring 8 is then carried against the bottom of plate 1a and its upper end engages the bottom of piston 2 to bias piston 2 upwardly toward the valve closed position.

A compressed air supply conduit is connected to channels 9 and 10 which are formed in the housing 1, while an outlet conduit is connected to channel 11. A source of high pressure air for operating the valve is then connected to channel 12 which communicates with space 13, as illustrated, where the space 13 is limited by the upper part of differential piston 2.

An air discharge channel 14 extending through the center of rod 3a and rod 3b is connected to communicate with the open air through channel 15 within the housing 1.

The piston 2 defines a second space 16 which is limited by its lower surface where the space 16 is normally in communication with channel 14 by means of a pressure-equalizing orifice 17.

The lower aperture of air outlet channel 14 has a collar 18 extending therearound which moves into sealing relationship with respect to a flexible sealing plate 19 contained at the bottom of chamber 1. This position is indicated in the dot-dash lines in the drawing.

Where it is desired to have the valve act as a one-way valve, it will be noted that the lower aperture of the air escape channel 14 is permanently sealed. The device, however, is illustrated herein for a two-way valve arrangement.

When the valve is in closed position as shown, space 16 is under atmospheric pressure because of the communication with open air through channel 14 and orifice 17. Thus, there is only atmospheric pressure on the under side of differential piston 2.

Thus, when a source of high pressure air is connected to channel 12 to increase the pressure in space 13, the valve will be quickly opened, since only a relatively small counter pressure is needed to overcome the biasing action of spring 8. Once the open valve position is reached, the air escape channel 14 is closed by sealing plate 19 so that space 16 is filled with compressed air after a predetermined time delay determined by the size of pressure-equalizing orifice 17. The valve is held in this position against the counter pressure of spring 8 by a force which corresponds to the differential between the pressure of the compressed air and atmospheric pressure on the surface of differential piston 2 which surface is equal to the difference between the surface enclosed by sealing ring 7 and the surface enclosed by collar 18.

When the space 13 is placed in communication with open air as by operation of a valve connected in a conduit connected to opening 12, an extremely rapid closing motion of valve head 4 is caused, since the differential piston is now urged toward the closing direction by the force of the compressed air within space 16 acting on differential piston 2 as well as the force of the closing spring 8. When the valve is thus quickly closed, the space 16 is again emptied of compressed air through the pressure-equalizing orifice 17 and air escape channel 14 so that the valve is now prepared for a second opening operation when required.

Accordingly, it is seen that by the use of the novel differential piston 2 and the pressure-equalizing orifice 17, extremely rapid opening and closing operations of the valve are obtained.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claim.

I claim:

A compressed air valve for air blast circuit breakers comprising a valve seat, a cylinder, a piston unit including a piston slidable in said cylinder, a rod connected to said piston and a valve head carried by said rod for movement towards and from said seat, said piston unit having an exhaust passage therethrough, said piston having two surfaces of different area, a spring operatively engaging said piston unit to move the valve head towards the seat, means for connection of the surface of the piston nearest the valve head to a source of gas under pressure to move the valve head away from the seat, said surface being the larger of the two piston surfaces, said piston unit having a passage of small cross section therein connecting said exhaust passage to the space within the cylinder on the side of the piston having the small surface area, and means engageable with the piston unit as the valve moves to its greatest distance away from the valve seat to close said exhaust passage.

References Cited in the file of this patent

UNITED STATES PATENTS

| | | |
|---|---|---|
| 2,575,934 | Timmerman | Nov. 20, 1951 |
| 2,727,530 | Grove | Dec. 20, 1955 |
| 2,830,784 | Placette | Apr. 15, 1958 |
| 2,985,490 | Gates | May 23, 1961 |

FOREIGN PATENTS

| | | |
|---|---|---|
| 584,265 | Canada | Sept. 29, 1959 |